United States Patent
Keen et al.

(10) Patent No.: US 10,735,535 B2
(45) Date of Patent: Aug. 4, 2020

(54) METHODS AND SYSTEMS FOR ANALYZING VIEWER ENGAGEMENT OF ONLINE CONTENT

(71) Applicant: INTERNATIONAL BUSINESS MACHINES CORPORATION, Armonk, NY (US)

(72) Inventors: Martin G. Keen, Cary, NC (US); Hernan A. Cunico, Holly Springs, NC (US); Adam Smye-Rumsby, Reading, PA (US); Paul A. R. Frank, Berlin (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/995,404

(22) Filed: Jun. 1, 2018

(65) Prior Publication Data
US 2019/0373069 A1 Dec. 5, 2019

(51) Int. Cl.
*H04L 29/08* (2006.01)
*G06Q 50/00* (2012.01)
*G06F 16/9535* (2019.01)

(52) U.S. Cl.
CPC .......... *H04L 67/22* (2013.01); *G06F 16/9535* (2019.01); *G06Q 50/01* (2013.01)

(58) Field of Classification Search
CPC .. H04N 21/44222; H04H 60/33; H04L 67/22; G06Q 50/01
See application file for complete search history.

(56) References Cited

U.S. PATENT DOCUMENTS

| | | | |
|---|---|---|---|
| 9,563,901 B2 | 2/2017 | Fleischman et al. | |
| 10,057,651 B1* | 8/2018 | Singh | H04N 21/4394 |
| 10,110,545 B1* | 10/2018 | Freay | H04L 51/14 |
| 2011/0282943 A1* | 11/2011 | Anderson | G06Q 10/06 709/204 |
| 2013/0086063 A1 | 4/2013 | Chen et al. | |
| 2013/0091147 A1* | 4/2013 | Kim | G06F 16/3334 707/748 |
| 2014/0173642 A1* | 6/2014 | Vinson | H04N 21/4524 725/9 |
| 2016/0316032 A1 | 10/2016 | Brunn et al. | |
| 2016/0353172 A1 | 12/2016 | Miller et al. | |

(Continued)

*Primary Examiner* — Jeong S Park
(74) *Attorney, Agent, or Firm* — Griffiths & Seaton PLLC (57) ABSTRACT

Embodiments for analyzing viewer engagement of online content by one or more processors are described. For each of a plurality of online channels having a piece of content posted thereon, viewer engagement associated with the piece of content and information associated with the posting of the piece of content on the respective online channel is received. The viewer engagement from each of the plurality of online channels is compared to the viewer engagement from the others of the plurality of the online channels. Based on the comparing of the viewer engagement and the information associated with the posting of the piece of content, a correlation between the viewer engagement from each of the plurality of online channels and the information associated with the posting of the piece of content on each of the plurality of online channels is determined. A signal representative of the determined correlation is generated.

21 Claims, 6 Drawing Sheets

(56) References Cited

U.S. PATENT DOCUMENTS

2017/0316092 A1* 11/2017 Fichter .................. G06F 16/958
2018/0084310 A1*  3/2018 Katz ..................... G06F 16/783
2018/0365253 A1* 12/2018 Francis ................. G06F 16/958
2019/0073596 A1*  3/2019 Hui ....................... H04L 51/32

* cited by examiner

METHODS AND SYSTEMS FOR ANALYZING VIEWER ENGAGEMENT OF ONLINE CONTENT

BACKGROUND OF THE INVENTION

Field of the Invention

The present invention relates in general to computing systems, and more particularly, to various embodiments for analyzing viewer engagement of online content.

Description of the Related Art

Content, such as text, images, and videos, can be posted on various online channels (e.g., Internet channels, web channels, etc.), such as social media platforms, online forums, and other websites. For example, a video may be posted (or uploaded) to a video streaming (or video sharing) website and then embedded (or shared) using a video player on other channels, such as social media platforms and forums. As such, users may view the content (i.e., the same piece of content), as well as engage with the content by, for example, leaving comments, "votes," sharing/re-posting the content, etc., in different places (i.e., on multiple online channels).

In some cases, the content receives significantly different viewer engagement across the different channels to which it is posted. For example, the content may receive very positive engagement on one channel and relatively negative engagement (or just very little engagement) on another channel.

SUMMARY OF THE INVENTION

Various embodiments for analyzing viewer engagement of online content by one or more processors are described. In one embodiment, by way of example only, a method for analyzing viewer engagement of online content, again by one or more processors, is provided. For each of a plurality of online channels having a piece of content posted thereon, viewer engagement associated with the piece of content and information associated with the posting of the piece of content on the respective online channel are received. The viewer engagement from each of the plurality of online channels is compared to the viewer engagement from the others of the plurality of the online channels. Based on the comparing of the viewer engagement and the information associated with the posting of the piece of content, a correlation between the viewer engagement from each of the plurality of online channels and the information associated with the posting of the piece of content on each of the plurality of online channels is determined. A signal representative of the determined correlation is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, content, such as text, images, and videos, can be posted on various online channels (e.g., Internet channels, web channels, etc.), such as social media platforms, online forums, and other websites. For example, a video may be posted (or uploaded) to a video streaming (or video sharing) website and then embedded (or shared) using a video player on other channels, such as social media platforms and forums. As such, users may view the content (i.e., the same piece of content), as well as engage with the content by, for example, leaving comments, "votes," sharing/re-posting the content, etc., in different places (i.e., on multiple online channels).

In some cases, the content receives significantly different viewer engagement across the different channels to which it is posted. For example, the content may receive very positive engagement on one channel and relatively negative engagement (or just very little engagement) on another channel.

The different engagement may be related to the "manner" with which the content is presented on the different channels (e.g., the channel itself, the context in which/the purpose for which the content is posted/shared, the audience/identification of the viewers, etc.). For example, the original posting (e.g., on a video streaming website) may have a particular title and/or description native to that channel, while the other channels referencing the video may have their own attributes, such as being found in a particular "thread" and/or being accompanied by a different title and/or description on a social media platform. However, generally speaking, there is no way for content creators (or posters) to understand why content receives different engagement on different channels and/or know the best channels for posting particular types of content.

To address these needs, some embodiments described herein provide methods and systems for analyzing viewer engagement of online content. The described embodiments may derive why a channel, context, and audience led to particular reactions, as measured by the engagement metrics available in each channel. For example, an embedded video that was shared to an inappropriate audience or location, or was presented misleadingly, may receive relatively negative engagement. It should be noted that the embodiments described herein may be applied to any type of content, such as videos, text, images, etc.

In some embodiments, the methods and systems analyze engagement related to a single piece of content as it is shared across multiple channels (and/or posts) to derive differences in popularity, sentiment, tone, and topic. The methods and systems may (also) analyze the channel, audience, title, and description to derive insights (or correlations) as to why content was perceived positively in one channel and negatively in another. The methods and systems may (also) generate recommendations to maximize audience engagement with similar content in the future based on the derived insights.

According to some embodiments described herein, a cognitive analysis is performed on various data related to the content, such as the viewer engagement (e.g., comments, re-posts/shares, reactions, etc.) and the content itself, or more perhaps specifically, information associated with the content as it is posted on a particular channel (e.g., an identification of the channel, the audience/viewers, a title, label, and/or description of the content, etc.). The cognitive analysis may include classifying natural language, analyzing tone, and analyzing sentiment (e.g., scanning for keywords, key phrases, etc.). Based on the cognitive analysis, the viewer engagement and/or the content itself may be graded, scored, etc. Correlations (or insights) may then be generated (or determined) between the viewer engagement and the content, thus allowing recommendations to be generated with respect to posting subsequent pieces of content (e.g., over time, after multiple cycles using machine learning, etc.).

As such, in some embodiments, the methods and/or systems described herein may utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, users' or viewers' engagement with online content based on, for example, the manner in which the content is posted. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for analyzing viewer engagement of online content is provided. For each of a plurality of online channels having a piece of content posted thereon, viewer engagement associated with the piece of content and information associated with the posting of the piece of content on the respective online channel is received. The viewer engagement from each of the plurality of online channels is compared to the viewer engagement from the others of the plurality of the online channels. Based on the comparing of the viewer engagement and the information associated with the posting of the piece of content, a correlation between the viewer engagement from each of the plurality of online channels and the information associated with the posting of the piece of content on each of the plurality of online channels is determined. A signal representative of the determined correlation is generated.

Each of the plurality of online channels may include a social media platform or an online forum. The piece of content may include at least one of text, an image, and an embedded video.

A recommendation associated with the posting of a second piece of content on at least one of the plurality of online channels may be determined based on the determined correlation. A signal representative of the determined recommendation may be generated.

The comparing of the viewer engagement from each of the plurality of online channels to the viewer engagement from the others of the plurality of the online channels may include at least one of classifying the natural language of the viewer engagement, analyzing the tone of the viewer engagement, and analyzing the sentiment of the viewer engagement.

The information associated with the posting of the piece of content on each of the plurality of online channels may include at least one of an identification of the respective online channel, an identification of the viewers of the piece of content on the respective online channel, a title of the piece of content on the respective online channel, and a description of the piece of content on the respective online channel.

The determining of the correlation between the viewer engagement from each of the plurality of online channels and the information associated with the posting of the piece of content on each of the plurality of online channels may include at least one of classifying the natural language of the information, analyzing the tone of the information, and analyzing the sentiment of the information.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
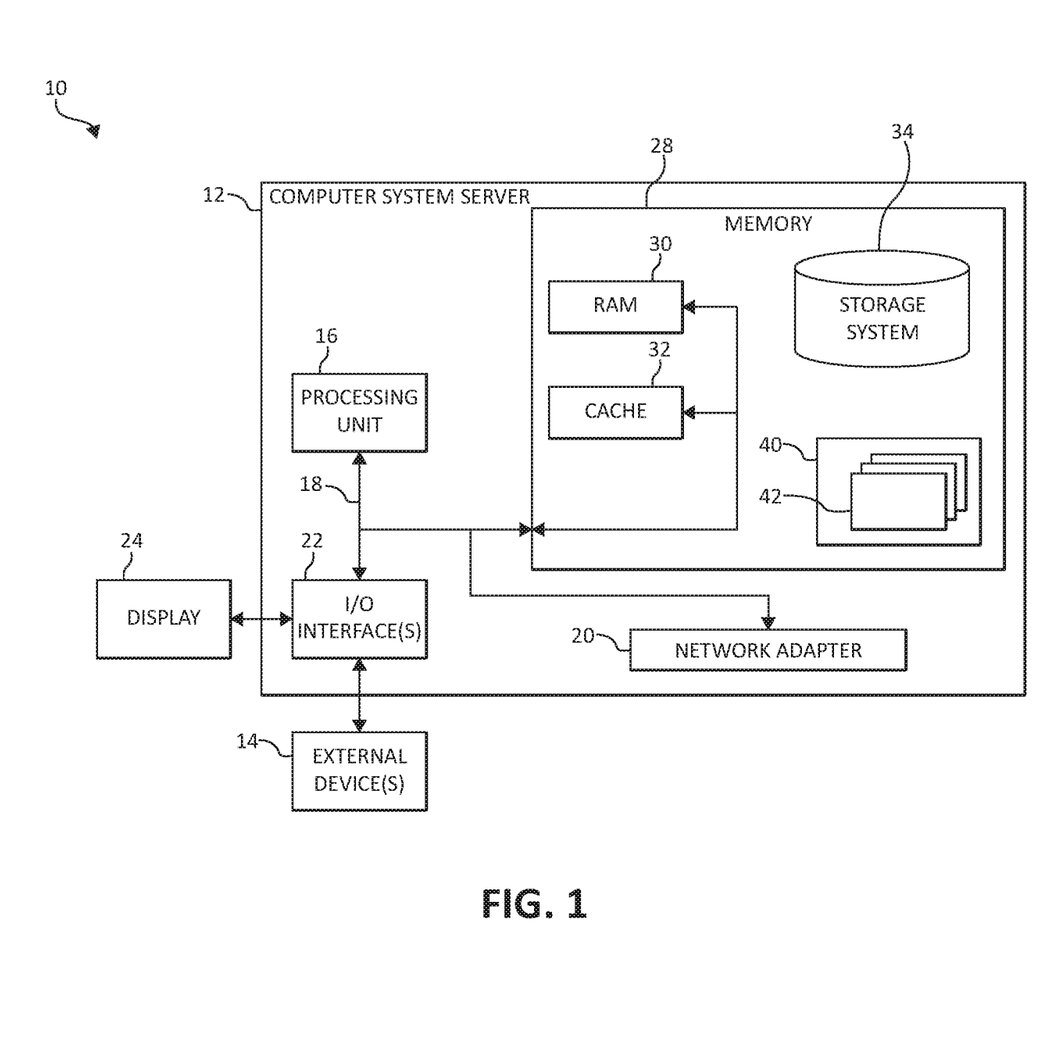
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
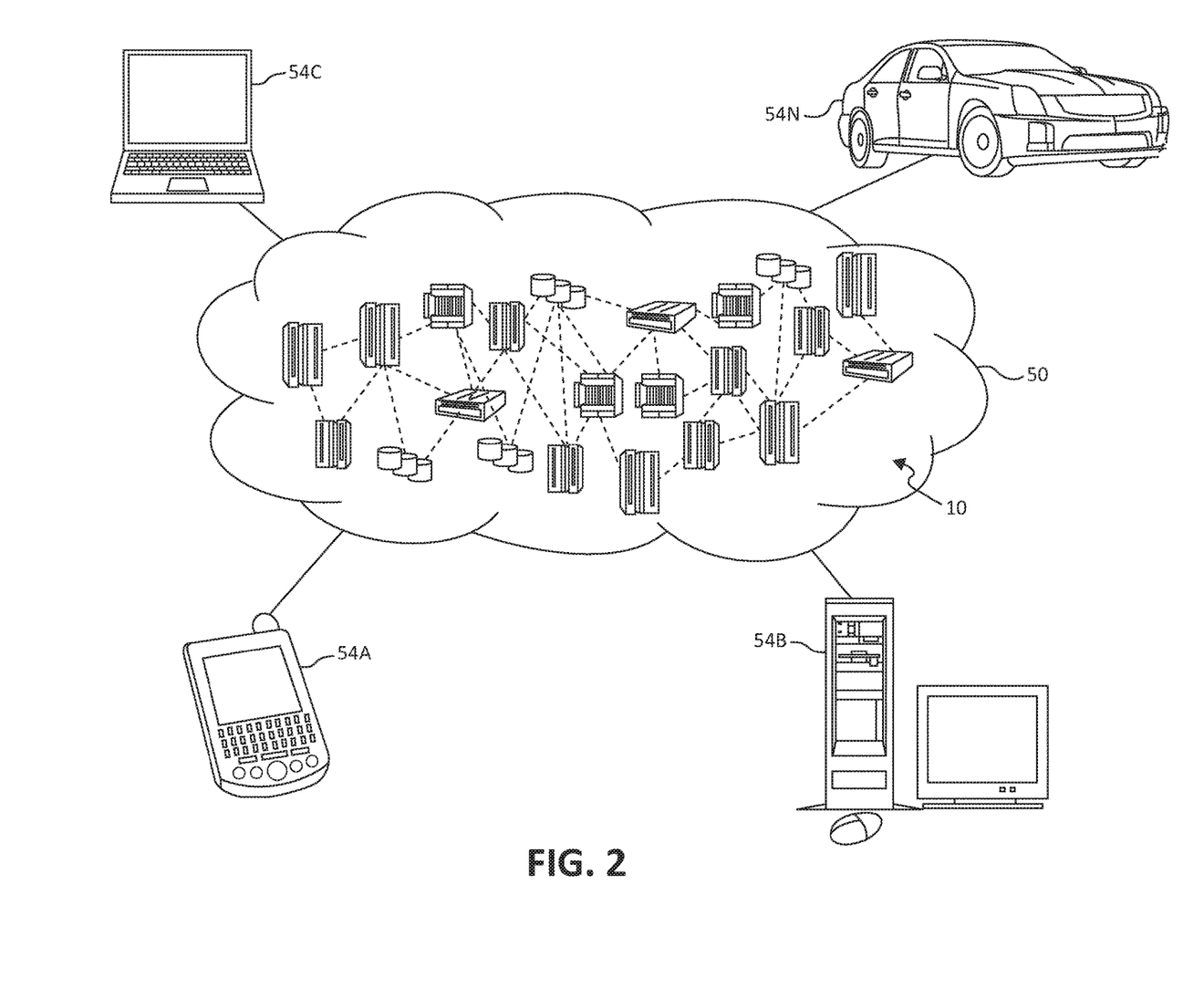
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
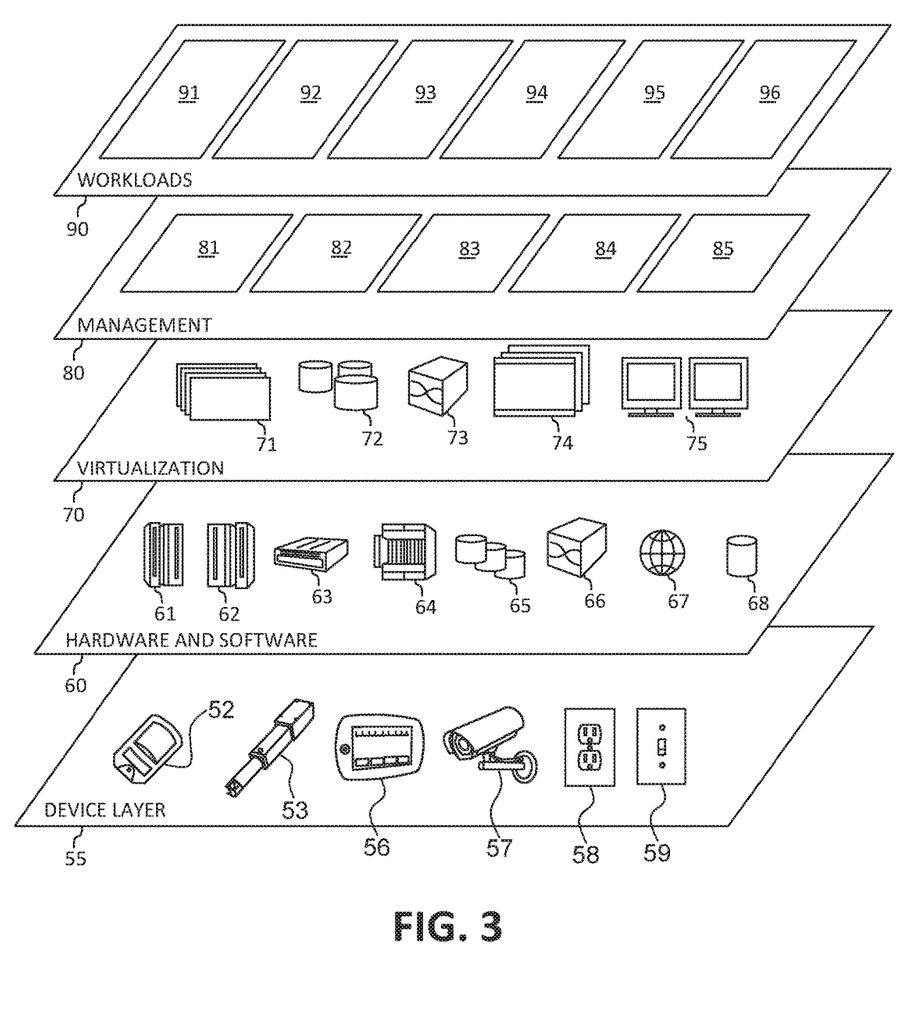
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for analyzing viewer engagement of online content as described herein. One of ordinary skill in the art will appreciate that the workloads and functions 96 for analyzing viewer engagement of online content may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, a cognitive analysis is performed on various data related to the content, such as the viewer engagement (e.g., comments, re-posts/shares, reactions, etc.) and the content itself, or more perhaps specifically, information associated with the content as it is posted on a particular channel (e.g., an identification of the channel, the audience/viewers, a title, label, and/or description of the content, etc.). The cognitive analysis may include classifying natural language, analyzing tone, and analyzing sentiment (e.g., scanning for keywords, key phrases, etc.). Based on the cognitive analysis, the viewer engagement and/or the content itself may be graded, scored, etc. Correlations (or insights) may then be generated (or determined) between the viewer engagement and the content, thus allowing recommendations to be generated with respect to posting subsequent pieces of content (e.g., over time, after multiple cycles using machine learning, etc.).

In some embodiments, a piece of content is posted to multiple online channels. The content may be or include any type of content, such as text, images, and embedded files, such as videos and/or audio files. For example, the content creator (or administrator) may actively post the content on multiple channels in an unrelated manner or may post the content on one channel and "share" the original post on other channels (e.g., post a video on a video streaming website and share the original post on other channels, such as social media platforms). Examples of online channels include, but are not limited to, social media platforms (or websites), online/discussion forums, and other websites (e.g., video streaming websites or any website that allows for viewer engagement).

Figure 4:
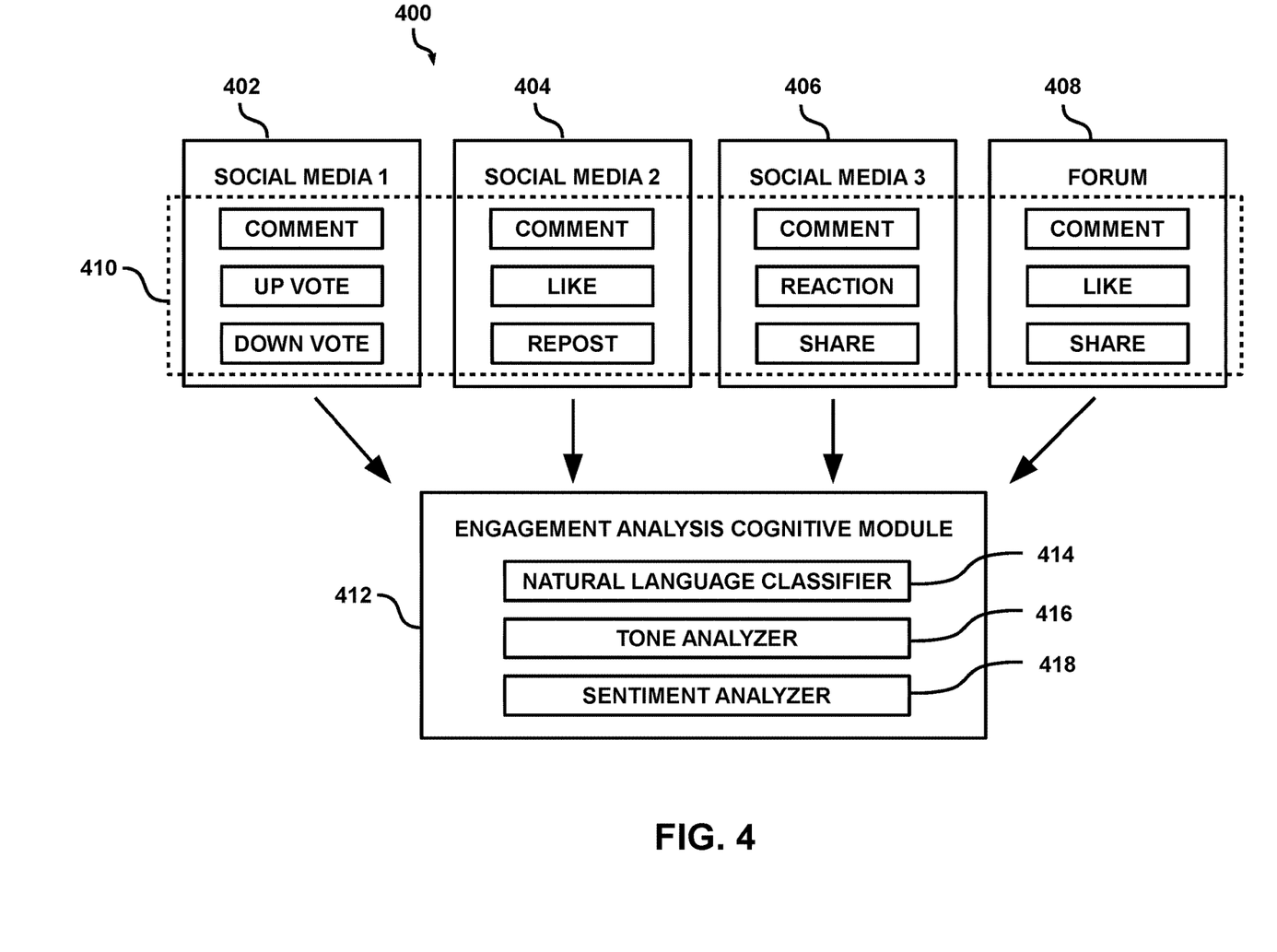
FIG. 4 is a flowchart/block diagram of a system for analyzing viewer engagement of online content according to an embodiment of the present invention.

Referring now to FIG. 4, a block diagram of a system (and/or method) 400 in accordance with some aspects described herein is shown. In the system 400 shown, a piece of content has been posted on multiple (e.g., four) online channels, as indicated by posts 402-408. As indicated within the posts, posts 402, 404, and 406 correspond to posts made on (or shared to) social media platforms, while post 408 corresponds to the content being posted within an online forum. However, it should be understood that other types of online channels may be utilized, such as other types of websites that provide means for viewer engagement (e.g., video streaming websites, business/company websites, etc.)

Each of the posts 402-408 has viewer engagement 410 associated therewith. As is commonly understood, viewer engagement may refer to any manner in which a viewer of the content may react or respond to the content through the respective online channel in such a way that it may be tracked, monitored, or stored (i.e., via a computing device, as opposed to merely mental reactions). In the example shown, the viewer engagement 410 across all of the posts 402-408 includes comment(s), up vote(s), down vote(s), "like(s)," repost(s), reaction(s), and share(s), with each type being associated with the appropriate online channel.

In some embodiments, the various online channels to which the piece of content is posted (or shared, etc.) are monitored (or checked or scanned) for viewer engagement 410 left in response to and/or associated with the posts 402-408. As shown, the viewer engagement 410 is received (or detected, identified, retrieved, etc.), by an engagement analysis cognitive module (or more simply, a "cognitive module") 412. Although not shown in detail, the cognitive module 412 may be implemented on (and/or include) any suitable computing system or device, such as those described above. In some embodiments, the cognitive module 412 includes a natural language classifier 414, a tone analyzer 416, and a sentiment analyzer 418 (and/or utilizes such services or software).

Generally, the cognitive module 412 (and/or the system as a whole) analyzes the viewer engagement 410 for the piece of content across each post (or channel) 402-408 where the content was posted/shared. In some embodiments, each post on each channel is analyzed in turn. Viewer engagement is analyzed to derive the source of that engagement and assigned accordingly. For example, if the content includes a video originally posted on a video streaming website and has received five "likes," and three of the likes were generated by viewers who encountered the video through a social media post, then that social media post is assigned those three engagement numbers.

Within the cognitive module 412, the natural language classifier 414 may interpret and classify natural language (e.g., based on keywords, key phrases, etc.). This may be used to analyze comments to derive what they are referring to. The result may be a list of classifications and confidence levels. For example, if the content is a drone-captured video of a beach wedding, comments may pertain to the drone (e.g., a question asking which model of drone captured the footage), the setting (e.g., the beach, weather conditions, etc.), the occasion (e.g., the wedding or bride), etc. The tone analyzer 416 may derive the emotions, language styles, and social tendencies to derive the tone of natural language. The sentiment analyzer 418 may derive whether or not the sentiment of the language relates to a positive, negative, or neutral statement.

With the classification, tone, and sentiment of engagement derived for each post (or channel) 402-408, the system then compares the engagement across the different channels (e.g., searches for parity and/or differences between the channels). In some embodiments, significant differences between the engagement for the post on different channels are marked (or identified). These differences may be related to, for example, the apparent popularity of the content, the sentiment of the viewer engagement, the tone of the viewer engagement, and the topic of the viewer engagement. For example, with respect to popularity, on one social media platform (or channel), a post may result in a large number of up votes and comments, while on another social media platform, the same content receives no reactions or shares. With respect to sentiment, on one social media platform, the content may receive a relatively high percentage (e.g., 80%) of positive sentiment (e.g., positive comments and likes), while on another social media platform, the content receives a significantly lower percentage (e.g., 30%) of positive sentiment (and/or a high percentage of negative sentiment). With respect to tone, on a first social media platform, the content receives engagement (e.g., comments) using primarily joyous, agreeable language, while on another social media platform, the content receives primarily angry, analytical engagement. With respect to topic, the viewer engagement (e.g., comments) received on a social media platform may focus on a topic different than that in an online discussion forum. For example, with respect to the beach wedding example mentioned above, the majority of comments on a social media platform may have pertained to the appearance of the bride, while the comments on a discussion forum for drone enthusiasts are primarily related to the technical aspects of capturing the video.

In determining whether or not any significant differences exist in the viewer engagement received across the different channels, the system may calculate (or compute) a viewer engagement score (or grade) for each of the different posts (or channels) 402-408. The viewer engagement score may be based on any suitable scale (e.g., positive or negative integers), and may be broken into components (e.g., popularity, sentiment, tone, topic, etc.). Significant differences in the viewer engagement may be identified if the determined if the viewer engagement scores for any of the posts/channels differs by an amount greater than a predetermined threshold (e.g., greater than 20%).

If significant differences in the viewer engagement are identified between two or more of the posts/channels and/or between particular components of the viewer engagement (e.g., popularity, sentiment, tone, topic, etc.), in some embodiments, the content and/or information associated with the posting of the content on the different channels is then analyzed. For example, in some embodiments, the content (and/or information related to the posting of the content) is analyzed with respect to the channel, the audience, the title, and the description of the content (or the content itself).

With respect to the channel, the identification or the channel and/or the particular "location" of where the content is posted on the channel may be considered. For example, if the channel is a social media platform or discussion forum, the identification of the social media platform or discussion forum itself is considered, as well as the particular thread or group in/to which the content was posted/shared. With respect to the audience, the identification of the users/viewers who saw/viewed the post on the channel may be considered. For example, if the content is posted on a particular user's social media account, the identification of the user's followers may be considered. With respect to the title, the natural language classifications and tone of the words used in the title may be considered. For example, in a social media post, whether or not the words used in a title are determined to be jovial or "matter of fact" and which elements of the content are referred to in the title may be considered. With respect to the description, the natural language classifications and tone of the words used in the description, or in the case of textual content, those of the words used in the content itself, may be considered.

Figure 5:
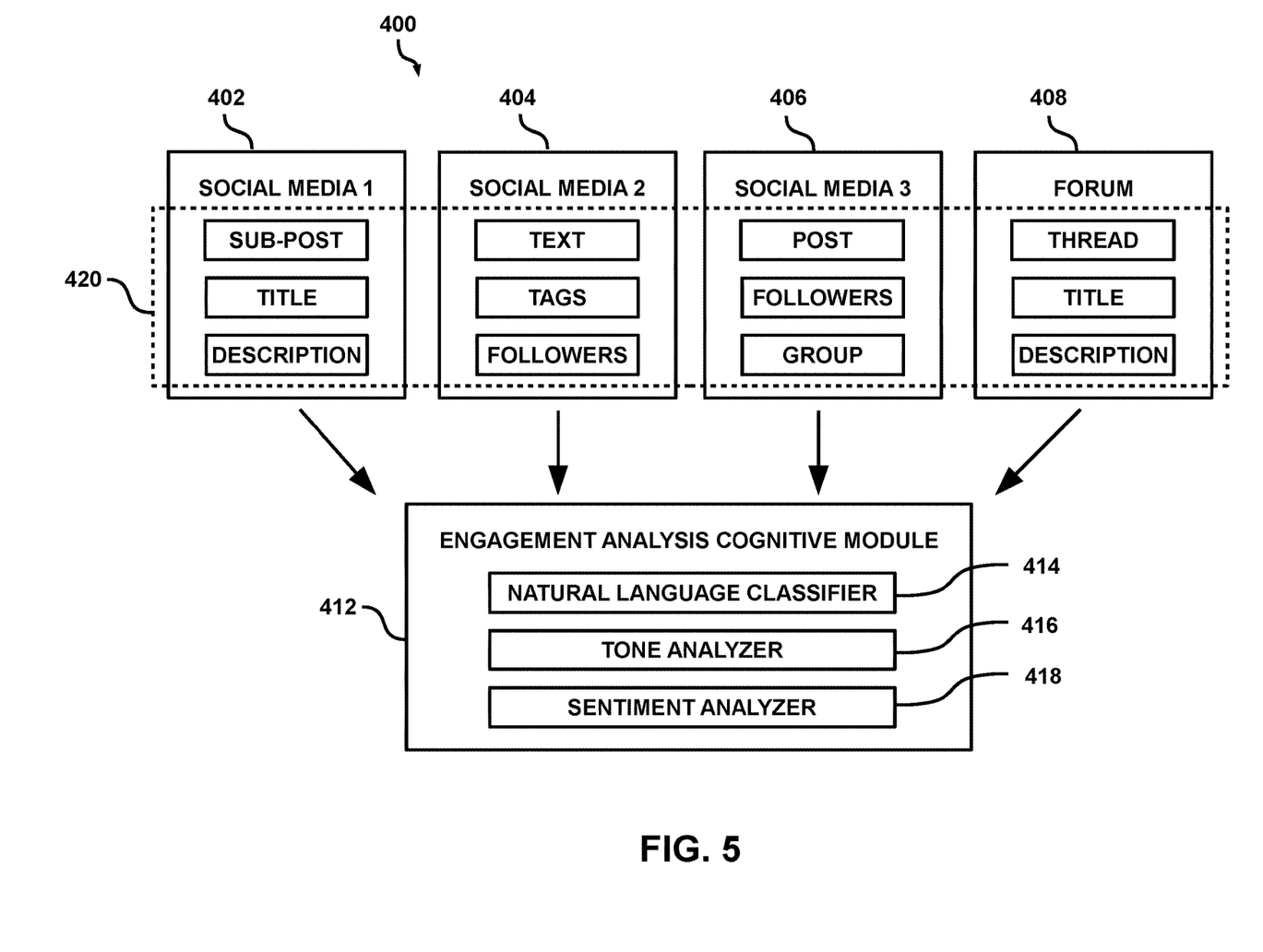
FIG. 5 is a flowchart/block diagram of a system for analyzing information associated with the posting of online content according to an embodiment of the present invention.

As such, in some embodiments, cognitive services may be used to analyze the content and/or information associated with the posting of the content on the different channels. An example is shown in FIG. 5, in which system 400 is again shown utilizing the cognitive module 412. However, it should be noted in FIG. 5, that the posts 402-408 include (or have associated therewith) content information 420 (e.g., information related to the channel, audience, title, description/content, etc.), as described above. In the particular example shown in FIG. 5, the content information 420 across all of the posts 402-408 includes sub-post(s), title(s), description(s), text, tags, followers, post(s), group(s), and thread(s), with each type being associated with the appropriate online channel. The content information 420 is received (or detected, identified, retrieved, etc.) by the cognitive module 412 (or a similar module or other services) and analyzed as described above.

In some embodiments, the analysis of the viewer engagement is then compared to the analysis of the content to, for example, derive insights (or correlations) to explain the contrasting viewer engagement received on the different channels. This comparison (or analysis) may be performed using machine learning, cognitive analysis, etc. similar to that described above. The insights (or correlations) may be related to, for example, the representativeness of the content, the appropriateness of the location/channel, and/or the appropriateness of the audience.

The representativeness of the content may be related to whether or not the content is (or was) posted/shared in an accurate and/or understandable way (e.g., regarding the title or description). For example, on one channel, the content may be titled or described as "Understanding how X processors work," while on another channel, the content is titled or described as "Speed up your computer by 100×!" In such an instance, the analysis of the engagement may determine that the title/description on the first channel was relatively accurate, while the title/description on the second channel was misleading, if not outright inaccurate.

The appropriateness of the location/channel may be related to the channel or particular location on the channel where the content is posted/shared. For example, content related to how particular processors work may receive different engagement depending on exactly where it is posted on a channel. That is, if posted in a social media group or thread particularly related to processors or the manufacturer of the processors, such content may receive relatively high levels of engagement and/or mostly positive engagement. However, if posted in a social media group or thread related to software, such content may receive low levels of engagement and/or mostly negative engagement (e.g., because the content is less relevant to that group/thread).

The appropriateness of the audience may be related to the users/viewers who saw (or see) the content when posted on a particular channel. For example, content related to how particular processors work may receive different engagement depending on the users/viewers who typically see the content posted on particular channels. That is, if posted in a social media group with members who are interested in computers and/or work for the manufacturer, such content may receive relatively high levels of engagement and/or mostly positive engagement. However, if posted in a social media group with members who have no interest in computers, such content may receive low levels of engagement and/or mostly negative engagement.

Any derived insights (or correlations) may be saved/stored, as may any other generated data (e.g., related to the comparison of the viewer engagement, the analysis of the content, etc.). A signal representative of the insights may be generated (e.g., in the form of an electronic communication, such as an email or visual message, provided to an administrator or user of the system).

The method described above may be repeated for multiple pieces of content (i.e., pieces of content posted/shared to multiple online channels). Over time, the system may generate improved correlations between the viewer engagement and the content such that recommendations regarding the posting of subsequent content to one or more of the online channels. More particularly, the system may generate recommendations for which channels are most appropriate (i.e., are likely to receive good viewer engagement) for posting/sharing certain content and the best way to present the content (e.g., in terms of title, description, particular location, etc.). For example, with respect to the example of the content related to processors described above, the system may provide the following recommendations: on a first social media platform, post in a particular group/thread and include a factual, objective title; on a second social media platform, include a particular tag; and do not post the content at all on a third social media platform. A signal representative of the recommendations may be generated (e.g., in the form of an electronic communication, such as an email or visual message, provided to an administrator or user of the system).

Figure 6:
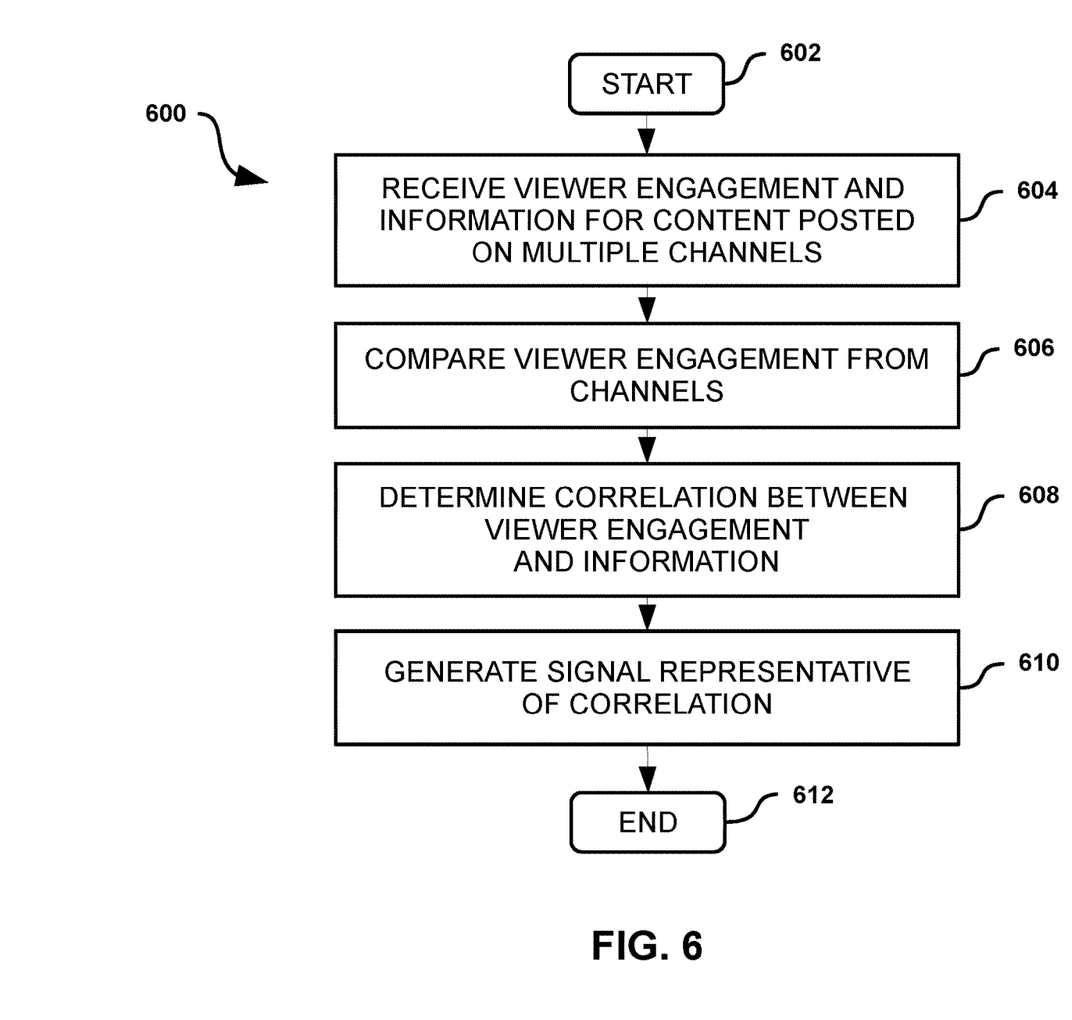
FIG. 6 is a flowchart diagram of an exemplary method for analyzing viewer engagement of online content according to an embodiment of the present invention.

Turning to FIG. 6, a flowchart diagram of an exemplary method 600 for analyzing viewer engagement of online content, according to some embodiments described herein, is provided. Method 600 begins (step 602) with, for example, a piece of content being posted and/or shared on multiple online channels. The online channels may include social media platforms, online forums, video streaming websites, or any other website that allows for viewer engagement as described above. The piece of content may include at least one of text, an image, and an embedded video.

For each of the channels, viewer engagement associated with the piece of content and information associated with the posting of the piece of content on the respective online channel is received (step 604). The viewer engagement may include comments, reactions, re-posts/shares, etc. associated with the piece of content. The information associated with the posting of the piece of content on each of the online channels may include at least one of an identification of the respective online channel, an identification of the viewers of the piece of content on the respective online channel, a title of the piece of content on the respective online channel, and a description of the piece of content on the respective online channel.

The viewer engagement from each of the online channels is compared to the viewer engagement from the other online channels (step 606). The comparing of the viewer engagement from each of the online channels to the viewer engagement the other online channels may include at least one of classifying the natural language of the viewer engagement, analyzing the tone of the viewer engagement, and analyzing the sentiment of the viewer engagement.

Based on the comparing of the viewer engagement and the information associated with the posting of the piece of content, a correlation between the viewer engagement and the information associated with the posting of the piece of content is determined (step 608). The determining of the correlation between the viewer engagement from each of the online channels and the information associated with the posting of the piece of content on each of the online channels may include at least one of classifying the natural language of the information, analyzing the tone of the information, and analyzing the sentiment of the information.

A signal representative of the determined correlation is generated (step 610). For example, the determined correlation may be stored or saved on a computing device and/or sent to an appropriate individual (e.g., an administrator) via an electronic communication (e.g., an email, text message, etc.).

Method 600 ends (step 612) with, for example, the determined correlation being viewed by an appropriate individual, which may then be used for posting subsequent content to online channels (e.g., to maximize positive viewer engagement). In some embodiments, a recommendation associated with the posting of a second piece of content on at least one of the plurality of online channels may be determined based on the determined correlation. A signal representative of the determined recommendation may be generated (e.g., an electronic message may be sent to an appropriate individual, as described above).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for analyzing viewer engagement of online content comprising:
   for each of a plurality of online channels having a piece of content posted thereon, receiving viewer engagement associated with the piece of content and information associated with the posting of the piece of content on the respective online channel;
   comparing the viewer engagement from each of the plurality of online channels to the viewer engagement from the others of the plurality of the online channels;
   based on the comparing of the viewer engagement and the information associated with the posting of the piece of content, determining a correlation between the viewer engagement from each of the plurality of online channels and the information associated with the posting of the piece of content on each of the plurality of online channels; wherein determining the correlation includes determining differences in the viewer engagement of the piece of content posted with first respective user-supplied information associated with the posting to one of the plurality of online channels as compared to the viewer engagement of the piece of content posted with second respective user-supplied information associated with the posting to another one of the plurality of online channels, the first respective user-supplied information differing from the second respective user-supplied information; and wherein the first respective user-supplied information and the second respective user-supplied information associated with the posting each include at least a title of the piece of content, a description of the piece of content, and a thread or path on the respective online channel the piece of content is posted under such that the differences in the viewer engagement are determined according to the compared differences in the title, the description, and the thread or path between the first respective user-supplied information associated with the posting to the one of the plurality of online channels and the second respective user-supplied information associated with the posting to the other one of the plurality of online channels; and
   generating a signal representative of the determined correlation.

2. The method of claim 1, wherein each of the plurality of online channels includes a social media platform or an online forum.

3. The method of claim 1, further comprising:
   determining a recommendation associated with the posting of a second piece of content on at least one of the plurality of online channels based on the determined correlation; and
   generating a signal representative of the determined recommendation.

4. The method of claim 1, wherein the comparing of the viewer engagement from each of the plurality of online channels to the viewer engagement from the others of the plurality of the online channels includes at least one of classifying the natural language of the viewer engagement, analyzing the tone of the viewer engagement, and analyzing the sentiment of the viewer engagement.

5. The method of claim 1, wherein the information associated with the posting of the piece of content on each of the plurality of online channels includes at least one of an identification of the respective online channel and an identification of the viewers of the piece of content on the respective online channel.

6. The method of claim 5, wherein the determining of the correlation between the viewer engagement from each of the plurality of online channels and the information associated with the posting of the piece of content on each of the plurality of online channels includes at least one of classifying the natural language of the information, analyzing the tone of the information, and analyzing the sentiment of the information.

7. The method of claim 1, wherein the piece of content includes at least one of text, an image, and an embedded video.

8. A system for analyzing viewer engagement of online content comprising:
at least one processor that
for each of a plurality of online channels having a piece of content posted thereon, receives viewer engagement associated with the piece of content and information associated with the posting of the piece of content on the respective online channel;
compares the viewer engagement from each of the plurality of online channels to the viewer engagement from the others of the plurality of the online channels;
based on the comparing of the viewer engagement and the information associated with the posting of the piece of content, determines a correlation between the viewer engagement from each of the plurality of online channels and the information associated with the posting of the piece of content on each of the plurality of online channels; wherein determining the correlation includes determining differences in the viewer engagement of the piece of content posted with first respective user-supplied information associated with the posting to one of the plurality of online channels as compared to the viewer engagement of the piece of content posted with second respective user-supplied information associated with the posting to another one of the plurality of online channels, the first respective user-supplied information differing from the second respective user-supplied information; and wherein the first respective user-supplied information and the second respective user-supplied information associated with the posting each include at least a title of the piece of content, a description of the piece of content, and a thread or path on the respective online channel the piece of content is posted under such that the differences in the viewer engagement are determined according to the compared differences in the title, the description, and the thread or path between the first respective user-supplied information associated with the posting to the one of the plurality of online channels and the second respective user-supplied information associated with the posting to the other one of the plurality of online channels; and
generates a signal representative of the determined correlation.

9. The system of claim 8, wherein each of the plurality of online channels includes a social media platform or an online forum.

10. The system of claim 8, wherein the at least one processor further:
determines a recommendation associated with the posting of a second piece of content on at least one of the plurality of online channels based on the determined correlation; and
generates a signal representative of the determined recommendation.

11. The system of claim 8, wherein the comparing of the viewer engagement from each of the plurality of online channels to the viewer engagement from the others of the plurality of the online channels includes at least one of classifying the natural language of the viewer engagement, analyzing the tone of the viewer engagement, and analyzing the sentiment of the viewer engagement.

12. The system of claim 8, wherein the information associated with the posting of the piece of content on each of the plurality of online channels includes at least one of an identification of the respective online channel and an identification of the viewers of the piece of content on the respective online channel.

13. The system of claim 12, wherein the determining of the correlation between the viewer engagement from each of the plurality of online channels and the information associated with the posting of the piece of content on each of the plurality of online channels includes at least one of classifying the natural language of the information, analyzing the tone of the information, and analyzing the sentiment of the information.

14. The system of claim 8, wherein the piece of content includes at least one of text, an image, and an embedded video.

15. A computer program product for analyzing viewer engagement of online content by one or more processors, the computer program product comprising a non-transitory computer-readable storage medium having computer-readable program code portions stored therein, the computer-readable program code portions comprising:
an executable portion that, for each of a plurality of online channels having a piece of content posted thereon, receives viewer engagement associated with the piece of content and information associated with the posting of the piece of content on the respective online channel;
an executable portion that compares the viewer engagement from each of the plurality of online channels to the viewer engagement from the others of the plurality of the online channels;
an executable portion that, based on the comparing of the viewer engagement and the information associated with the posting of the piece of content, determines a correlation between the viewer engagement from each of the plurality of online channels and the information associated with the posting of the piece of content on each of the plurality of online channels; wherein determining the correlation includes determining differences in the viewer engagement of the piece of content posted with first respective user-supplied information associated with the posting to one of the plurality of online channels as compared to the viewer engagement of the piece of content posted with second respective user-supplied information associated with the posting to another one of the plurality of online channels, the first respective user-supplied information differing from the second respective user-supplied information; and
wherein the first respective user-supplied information and the second respective user-supplied information associated with the posting each include at least a title of the piece of content, a description of the piece of content, and a thread or path on the respective online channel the piece of content is posted under such that the differences in the viewer engagement are determined according to the compared differences in the title, the description, and the thread or path between the first respective user-supplied information associated with the posting to the one of the plurality of online channels and the second respective user-supplied information associated with the posting to the other one of the plurality of online channels; and an executable portion that generates a signal representative of the determined correlation.

16. The computer program product of claim 15, wherein each of the plurality of online channels includes a social media platform or an online forum.

17. The computer program product of claim 15, wherein the computer-readable program code portions further include:

an executable portion that determines a recommendation associated with the posting of a second piece of content on at least one of the plurality of online channels based on the determined correlation; and an executable portion that generates a signal representative of the determined recommendation.

18. The computer program product of claim 15, wherein the comparing of the viewer engagement from each of the plurality of online channels to the viewer engagement from the others of the plurality of the online channels includes at least one of classifying the natural language of the viewer engagement, analyzing the tone of the viewer engagement, and analyzing the sentiment of the viewer engagement.

19. The computer program product of claim 15, wherein the information associated with the posting of the piece of content on each of the plurality of online channels includes at least one of an identification of the respective online channel and an identification of the viewers of the piece of content on the respective online channel.

20. The computer program product of claim 19, wherein the determining of the correlation between the viewer engagement from each of the plurality of online channels and the information associated with the posting of the piece of content on each of the plurality of online channels includes at least one of classifying the natural language of the information, analyzing the tone of the information, and analyzing the sentiment of the information.

21. The computer program product of claim 15, wherein the piece of content includes at least one of text, an image, and an embedded video.

* * * * *